Sept. 12, 1939.   A. W. WHEATON   2,172,601
SELECTIVE CONTROL DEVICE
Filed Aug. 10, 1937   3 Sheets-Sheet 1
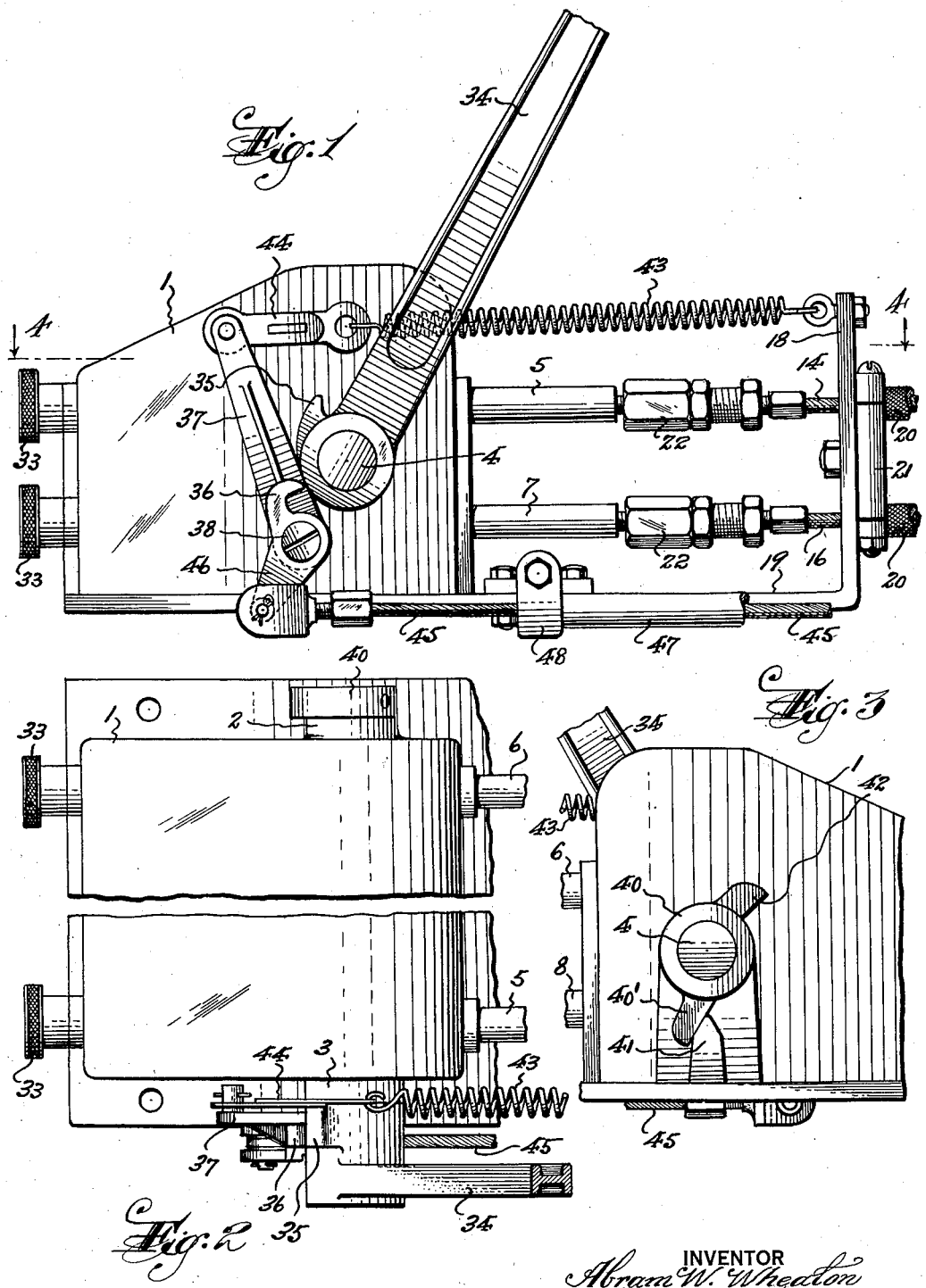

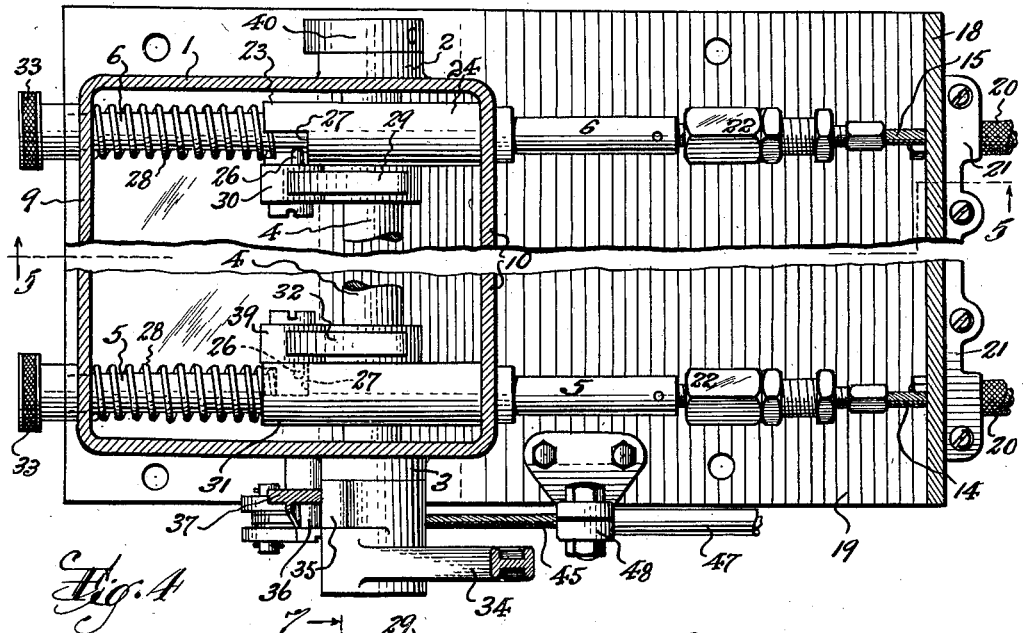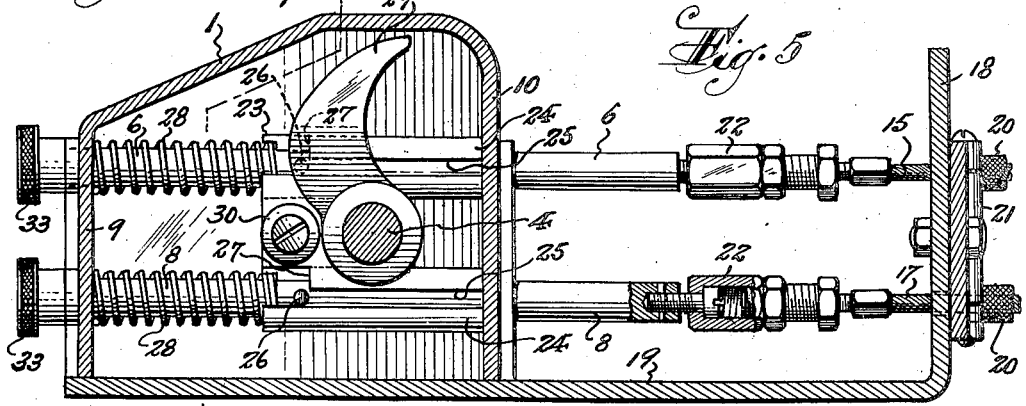

Sept. 12, 1939. A. W. WHEATON 2,172,601
SELECTIVE CONTROL DEVICE
Filed Aug. 10, 1937 3 Sheets-Sheet 3
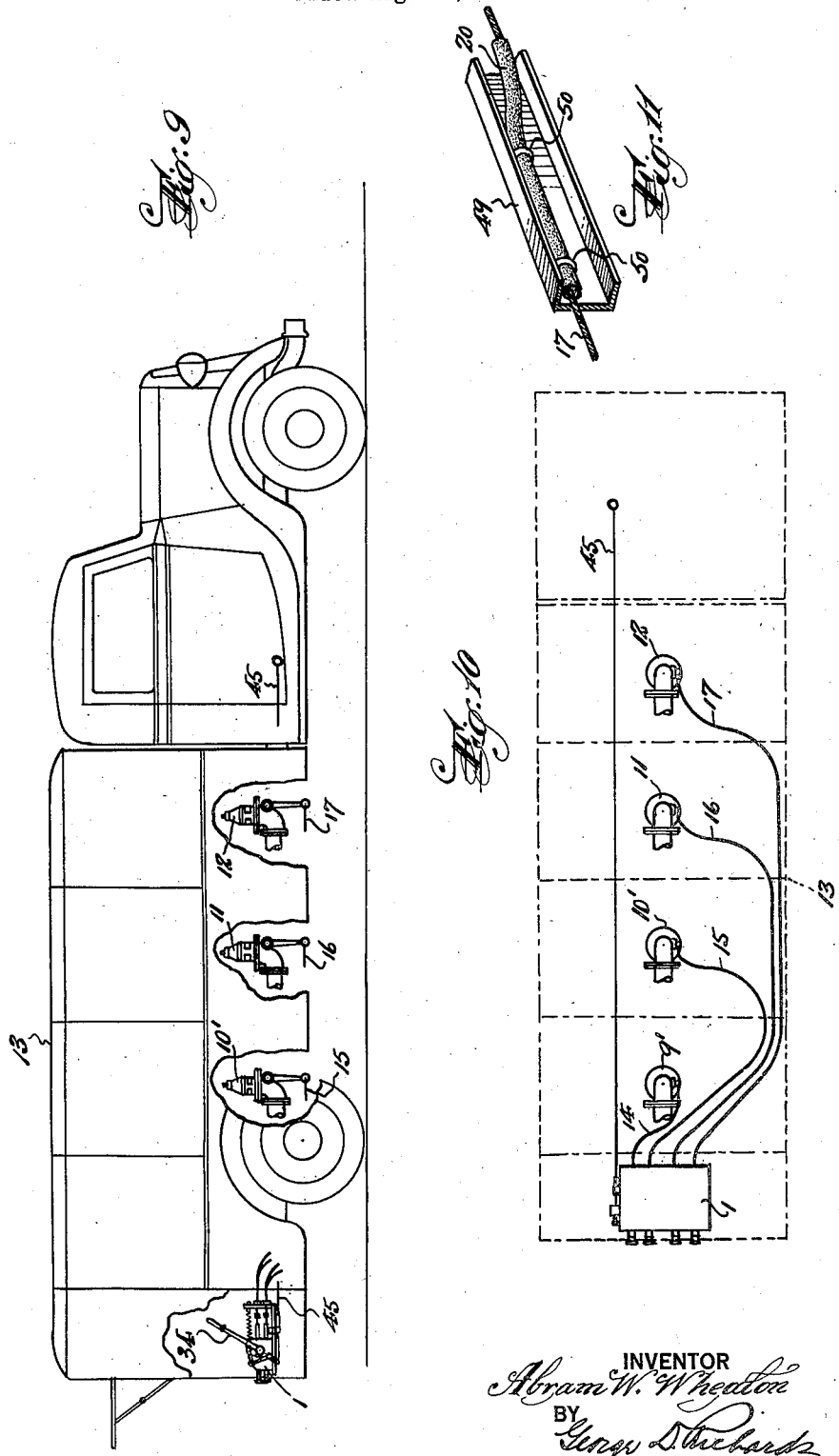
INVENTOR
Abram W. Wheaton
BY
George D. Richards
ATTORNEY Patented Sept. 12, 1939

2,172,601

UNITED STATES PATENT OFFICE 2,172,601

SELECTIVE CONTROL DEVICE

Abram W. Wheaton, Maplewood, N. J., assignor to A. W. Wheaton Brass Works, Newark, N. J., a corporation of New Jersey Application August 10, 1937, Serial No. 158,376

11 Claims. (Cl. 74—483)

My invention relates to improvements in selector control devices of the general type adapted for selectively operating remotely situated devices, valves, etc., and, more particularly, for selectively operating the emergency valves at the bottom of the respective compartments of a compartment tank truck for transporting oil and gasoline.

An object of my invention resides in the provision of an improved construction for a selector control device of the character referred to which has advantages over the various constructions proposed heretofore in the way of greater simplicity of construction and manner of operation, and greater efficiency generally.

Other objects and advantages will hereinafter appear.

For the purpose of illustrating my invention, an embodiment of a preferred form thereof is shown in the drawings, wherein Figure 1 is a side elevational view of a selector control device constructed and operating in accordance with my invention;

Fig. 2 is a plan view of Fig. 1;

Fig. 3 is a fragmentary, rear elevational view of Fig. 1;

Fig. 4 is a sectional view, the section being taken on the line 4—4 in Fig. 1;

Fig. 5 is a sectional view, the section being taken on the line 5—5 in Fig. 4;

Fig. 6 is a view similar to Fig. 5, but partly broken away and with the operating cam removed;

Fig. 7 is a sectional view, the section being taken on the line 7—7 in Fig. 5;

Fig. 8 is a fragmentary, sectional view, the section being taken on the line 8—8 in Fig. 6;

Fig. 9 is a simplified, side elevational view, partly broken away, of a compartment tank truck having my improved selector control device installed therein;

Fig. 10 is a simplified, bottom plan view of Fig. 9; and

Fig. 11 is an enlarged, detail, fragmentary view showing one arrangement of value operating pull cable conduits in supported connection with suitable parts of the tank truck frame.

Similar characters of reference are employed in the above described views, to indicate corresponding parts.

In the drawings the reference numeral 1 designates a housing provided at the opposite sides thereof with bearings 2 and 3 in which a shaft 4 is journalled for rotation about an axis transverse to the housing.

Valve-actuating elements, in the form of selector rods 5, 6, 7 and 8, extend longitudinally of the housing 1 and through openings in the end walls 9 and 10 thereof with a sliding fit. In the arrangement shown, the selector rods are parallel to each other, and the rods 5 and 6 are disposed above the rods 7 and 8, respectively. The shaft 4 extends at right angles to the selector rods 5, 6, 7 and 8, the rods 5 and 6 being on one side of the shaft 4, e. g. above the same, and the rods 7 and 8 being on the opposite side of the shaft 4, e. g. below the same.

The selector rods 5, 6, 7 and 8 are connected, as represented in Figs. 9 and 10, to the respective operating levers of the emergency valves 9', 10', 11 and 12 respectively at the bottom of the respective compartments of the truck 13, by corresponding cables 14, 15, 16 and 17, respectively. The valves 9', 10', 11 and 12 are of a conventional construction, and each comprises a lift valve arranged to close with the pressure in the tank compartment and a relatively stiff, compressed, coil spring on the valve stem urging or biasing the valve to the closed position thereof. Each of the valves is made to open, against the spring and hydraulic pressures thereon, by exertion of pulling force upon the cable which is connected to its operating lever. The cables pass loosely through a bearing or guide plate 18 spaced from and parallel to the end wall 10 of the housing 1. In the particular construction shown, the plate 18 is integral with and extends upwardly from an extension 19 of the bottom of the housing.

Preferably each of the cables is enclosed in and has a loose, sliding fit in the tubular guide conduit, such e. g. as lead-lined loom 20. The ends of the guide conduits at the selector control device are anchored thereto by suitable means which may be in the form of a clamping plate 21 secured to the plate 18.

Turnbuckles 22 of any suitable construction connect the selector rods 5, 6, 7 and 8 to the adjacent ends of the respective cables 14, 15, 16 and 17. As shown more clearly in Fig. 5, the construction of each turnbuckle is such that it allows for adjustment to take up slack which might develop in the cable, and also allows for swiveling rotation of the associated selector rod without twisting the cable.

Slidable actuator means is cooperatively related to the selector rods. In one preferred form thereof, such slidable actuator means comprises a U-shape slide block 23 which embraces or straddles the shaft 4, as more clearly shown in Figs. 5 and 6, so that a pair of selector rods 6 and 8 pass longitudinally through the respective opposite legs 24 of this block with a sliding fit. The legs 24 of the block 23 are respectively provided with longitudinal slots 25 for receiving, with a loose fit, pins 26 which are affixed to and which protrude from the respective rods 6 and 8. Also, the adjacent end of each slot is cut away, as shown, to permit swinging movement of the corresponding pin 26 and so as to form an offset angular shoulder or face 27 engageable by the pin for the purpose hereinafter explained.

Disposed on the rods 6 and 8 are springs 28 compressed between the end wall 9 of the housing and the opposed end of the actuator slide block 23, said springs operating at all times to urge the block to a normal initial retracted position, and stopped against the end wall 10 of said housing.

A cam 29 is fixed on the shaft 4 and is disposed for engagement with a roller 30 carried by the actuator slide block 23.

A like actuator slide block 31 and cooperating cam 32 are associated with the pair of selector rods 5 and 7, and are similar to and operate in the same manner and for the same purpose as the above described actuator slide block 23 and cam 29.

The pins 26 are normally in the position shown, i. e. in registration or alignment with the slots 25. For the purpose of making the assembly as symmetrical as possible, the actuator slide blocks 23 and 31 are placed with their slotted sides, which carry the rollers, facing each other.

Knobs 33 are fixed on the ends of the selector rods.

In operation, when it is desired to selectively open any one of the emergency valves 9', 10', 11 and 12, or all or any combination of these valves, to permit flow of fluid from a tank compartment to discharge lines, the particular knob or knobs 33 for manipulating the desired selector rod or rods are given a one-quarter turn in a counter-clockwise direction, as viewed in Fig. 7. The pin 26 of any selector rod so turned will thereby be swung about the axis of the rod into a position in front of the adjacent shoulder or face 27 of the associated actuator slide block, whereby the pin functions to couple such rod to said actuator slide block for accompanying outward movement with the latter when operative movement is imparted thereto.

An operating lever 34 is fixed on shaft 4, preferably on an end thereof exteriorly projecting from a side of the housing 1. This lever is manually operable to transmit turning movement to shaft 4, and thus to the cams 29 and 32 mounted on the latter. Also fixed on said shaft 4, preferably on the opposite end thereof which projects exteriorly from the opposite side of the housing 1, is a collar 40 having a radial stop lug 40' which abuts a stop post 41 to determine the normal initial position of said lever 34. Said collar 40 is also provided with a second radial stop lug 42 which is circumferentially spaced from said stop lug 40', the same being adapted for engagement with the opposite side of said stop post 41 to limit the operative stroke or swing of said lever 34 when the latter is manipulated.

When the operating lever 34 is pulled outwardly, i. e. from right to left as viewed in Fig. 1, rotative movement is imparted to shaft 4 and to cams 29 and 32 carried thereby. The turning of the respective cams against the rollers 30 and 39 functions to impart an outward sliding movement to the actuator slide blocks 23 and 31, and such outward movement is transmitted to such of the selector rods 5, 6, 7 and 8 which may have been coupled for movement therewith by the turning of their coupling pins 26 into engagement with the associated slide block shoulders or faces 27. Any of the selector rods 5, 6, 7 and 8 which have not been so coupled to the associated slide blocks will not receive the thrust of slide block movement, and consequently will not be moved so as to exert a pull upon the cable connecting the same with an emergency valve served thereby, and therefore such valve will not be opened.

Means are provided for holding the selectively actuated emergency valves open against the closing pressure of their springs during desired flow of fluid therethrough to the discharge lines of the truck tank with which they communicate. In a preferred form thereof, this means comprises a latch lug 35 radially projecting from the hub of the operating lever 34, and a detent means mounted in connection with the housing 1 by which said latch lug 35 is engaged when the lever 34 is swung to operative position. The detent means comprises a bell-crank lever pivotally mounted at 38, the same comprising an upwardly extending arm 37 and a downwardly extending arm 46. Integrally formed in connection with said bell-crank lever is a detent latch piece 36 adapted to engage with said latch lug 35.

Just after the latch lug 35 interlocks with the detent latch piece 36, said stop lug 49' engages the stop post 41 with which the housing is provided, whereby rotary movement of the cams is limited to an extent only necessary to effect a full opening of the selected connected emergency valve or valves.

The bell-crank lever 37 is urged or biased in a clockwise direction, as viewed in Fig. 1, by a tensioned spring 43 connected to the end of the lever arm 37 through a fusible link 44. When the operating lever 34 is swung outward, and the latch lug 35 and detent latch piece 36 interlocked to hold the lever against accidental retraction, and thereby, through the actuated slide blocks and selector rods, to hold open any selected emergency valve or valves, if a fire occurs the link 44 will fuse and part to release the spring tension from the bell-crank lever, and permit it to drop automatically or yield so as to disengage the detent latch piece 36 from the complementary latch lug 35. Any emergency valve which might have been open before will then be free to close immediately under the pressure of its spring and hydraulic pressure. Also, the slide blocks will be returned simultaneously to normal initial positions, i. e. the righthand position shown, and as stopped against the end wall 10 of the housing, on account of the engagement of the pin or pins 26 against the faces 27. If at least one of the selector rods associated with any actuator slide block had not been rotated before to place a pin 26 in front of the adjacent face 27, the compressed springs 28 will assist in returning the slide blocks to said normal initial positions. The shape and angular disposition of the cams and the complementary, engaging surfaces of the latch lug 35 and the detent latch piece 36, are such as to permit the latter to slip off the lug 35 bell-crank lever 37 is released, and to also permit and cause the shaft 4 to rotate in the clockwise direction, as viewed in Fig. 5, due to the righthand thrust of the rollers 30 and 39 against the complementary surfaces of the respective cams 29 and 32.

In the same manner, any emergency valve or valves which might be open at any time will be caused to close, and the various parts will be caused to return to their respective positions shown in the drawings, if the operator either releases the bell-crank lever 37 by forcibly overcoming its resistance upon reverse manipulation of hand lever 34 at the rear of the truck, or pulls, from a remote position at the front of the truck, on a cable 45 connected as shown to the lower arm 46 of the bell-crank lever. The trip cable 45 for remote control of the emergency valves to close the latter is also preferably guided in a conduit such as a lead-lined loom 47, one end of which is fixed with respect to the housing 1 by a suitable clamp 48.

If desirable, the guide conduits for the flexible cables may be held at several points to the adjacent side sill 49 or any other convenient part of the truck chassis, framing or superstructure by U-shaped fastening elements or clamps 50.

If there are a greater number of emergency valves to be controlled, additional selector rods and actuator slide blocks and cams, similar to those shown may be provided. In such case, the width of the housing 1 is made greater to accommodate these parts, as e. g. between the selector units shown. Each selector unit, comprising an actuator slide block, a selector rod, and a cam fixed on the shaft 4. As shown, these units are arranged so that a single cam and actuator slide-block cooperates with two selector rods, but it will be obvious that there may be provided a corresponding separate cam and actuator slide-block for each selector rod, if desired.

From the foregoing it will be seen that I have provided an improved construction of actuating means for selectively controlling the emergency valves of tank truck compartments, which is comparatively simple in structure and mode of operation; which can be easily installed in any standard compartment tank truck; and by which any emergency valve, or all or any combination of such valve, in a compartment tank truck can be easily opened, and in which provision is made for remote control to close the valve or valves and also for automatic release to permit the valve or valves to close in case of fire at the rear or any other part of the truck.

While my improved selective emergency valve actuating mechanism has been shown and described in connection with a compartment tank truck to actuate and control the emergency valves thereof, it will be understood that the device is susceptible to a broader adaptation, and can be used to actuate and control selectively and in a similar manner, valves in other situations or elements or units other than valves. Furthermore, it will be understood that various modifications, as to size, shape, number, arrangement and grouping of the parts, are possible without departing from the spirit of my invention or the scope of the claims. It is therefore intended that all matter contained in the above description or shown in the accompanying drawings shall be interpreted as illustrative and not in a limiting sense.

I claim as my invention:

1. A selector control device comprising a plurality of actuatable elements each supported for both axial and rotational movements, actuating means for imparting axial movement to said elements and comprising a power transmitting means common with respect to said elements and cam means operated by said power transmitting means, and cooperative means associated respectively with said elements and actuating means and being effective upon rotation of said elements selectively from an initial position to an operative position to effect an operating connection between said actuating means and the respective selected actuatable elements.

2. A selector control device comprising, a plurality of actuatable elements each supported for both axial and rotational movements, actuating means for imparting axial movement to said elements and comprising a power transmitting means common with respect to said elements and cams operated by said power transmitting means and cooperative respectively with certain of said elements, and cooperative means associated respectively with said elements and actuating means and being effective upon rotation of said elements selectively from a given position to a different position to effect an operating connection between said actuating means and the respective selected elements.

3. A selector control device comprising, a plurality of substantially parallel selector rods for operative connection with the remote devices to be controlled, said rods each being supported for both axial and rotational movements, actuating means for imparting axial movement to said rods, means for operating said actuating means comprising an operating shaft rotatable about an axis substantially transverse to said selector rods and cams rotatable with said operating shaft and cooperating respectively with certain of said selector rods, means respectively carried by said selector rods and being effective upon rotation of the latter selectively from a given inactive position to a different active position to effect an operating connection between said actuating means and the associated respective selected selector rods, and means for rotating said operating shaft.

4. A selector control device comprising, a plurality of substantially parallel selector rods for operative connection with the remote devices to be controlled, said rods each being supported for both axial and rotational movements, a power transmission shaft, cam means on said shaft, and means operative upon rotational movement of said rods to selectively subject the same to actuating thrust of said cam means whereby operative axial movement is selectively imparted thereto.

5. In a selector control device, a plurality of selector rods for operative connection with remote devices to be controlled, said rods being each supported for both axial and rotational movements, a block movable axially with respect to said rods, means for imparting axial movement to said block, and coupling means respectively carried by said rods adapted upon rotation of said rods selectively to shift said coupling means from a given angular position to a different angular position to effect a connection between said blocks and the respective selected rods, thereby to cause the latter to move axially with said block.

6. In a selector control device, a plurality of substantially parallel selector rods for operative connection with remote devices to be controlled, said rods being each supported for both axial and rotational movements, a block movable axially with respect to said rods, means for imparting axial movement to said block comprising a shaft transverse to said rods and cam means on said shaft to operatively engage said block, and coupling means carried by each rod adapted upon rotation of said rods selectively to shift said coupling means from a given inactive angular position to an active angular position to effect an operating connection between said block and the respective selected rods, thereby to cause the latter to move axially with said block.

7. In a selector control device, a plurality of substantially parallel selector rods for operative connection with remote devices to be controlled, said rods being each supported for both axial and rotational movements, a block movable axially with respect to said rods, means for imparting axial movement to said block comprising a shaft transverse to said rods and cam means on said shaft to operatively engage said block, and coupling means carried by each rod adapted upon rotation of said rods selectively to shift said coupling means from a given inactive angular position to an active angular position to effect an operating connection between said block and the respective selected rods, thereby to cause the latter to move axially with said block, a hand lever for actuating said shaft, a spring controlled detent means for holding said hand lever in operated position, said detent means being yieldable to return of said hand lever to normal initial position by manual operation thereof, and a thermal device for automatically releasing said detent means.

8. In a selector control device as defined in claim 7, an additional manipulatable means for releasing said detent means from a point remotely situated therefrom.

9. A selector control device comprising a housing, selector rods for operative connection with remote devices to be controlled, said rods being disposed in and extending longitudinally of and through the opposite end walls of said housing, said rods being movable axially with respect to said housing, a rotatable operating shaft extending transversely of said housing, a slide block means cooperative with said selector rods, cam means rotatable with said operating shaft and engageable with said slide block means to impart movement thereto in the direction axially of said selector rods, and coupling means associated respectively with said selector rods for effecting selective connection of the latter with said slide block means for such movement therewith.

10. In a selector control device as defined in claim 9, a hand lever for actuating said operating shaft, a spring controlled detent means for holding said hand lever in operated position, said detent means being yieldable to return of said hand lever to normal initial position by manual operation thereof, and a thermal device for automatically releasing said detent means.

11. In a selector control device as defined in claim 9, a hand lever for actuating said operating shaft, a spring controlled detent means for holding said hand lever in operated position, said detent means being yieldable to return of said hand lever to normal initial position by manual operation thereof, a thermal device for automatically releasing said detent means, and an additional manipulatable means for releasing said detent means from a point remotely situated therefrom.

ABRAM W. WHEATON.